United States Patent
Gonzalez et al.

(10) Patent No.: US 9,216,657 B2
(45) Date of Patent: Dec. 22, 2015

(54) EVCS POWER SWITCHING FOLLOWING A CATASTROPHIC SEISMIC EVENT

(71) Applicant: Schneider Electric USA, Inc., Palatine, IL (US)

(72) Inventors: Karla Morena Guajardo Gonzalez, Nuevo Leon (MX); Marcela Verónica Arizpe Rodriguez, Nuevo Leon (MX); Pablo Alejandro del Angel Marrufo, Nuevo Leon (MX); Jose Filiberto Escamilla Cañedo, Nuevo Leon (MX); Vladimir Cano Rodriguez, Nuevo Leon (MX); Gerardo Rodriguez Najera, Nuevo Leon (MX)

(73) Assignee: SCHNEIDER ELECTRIC USA, INC., Palatine, IL (US)

( * ) Notice: Subject to any disclaimer, the term of this patent is extended or adjusted under 35 U.S.C. 154(b) by 457 days.

(21) Appl. No.: 13/713,863

(22) Filed: Dec. 13, 2012

(65) Prior Publication Data
US 2014/0167692 A1    Jun. 19, 2014

(51) Int. Cl.
*H01M 10/46* (2006.01)
*B60L 11/18* (2006.01)

(52) U.S. Cl.
CPC .......... *B60L 11/1825* (2013.01); *Y02T 10/7005* (2013.01); *Y02T 90/121* (2013.01); *Y02T 90/128* (2013.01); *Y02T 90/14* (2013.01); *Y02T 90/16* (2013.01); *Y10T 307/766* (2015.04)

(58) Field of Classification Search
CPC .................................... H02J 9/04; H02J 11/00
USPC ................. 320/104, 107, 109; 73/1.85; 361/1
See application file for complete search history.

(56) References Cited

U.S. PATENT DOCUMENTS

| | | | |
|---|---|---|---|
| 2010/0225266 A1* | 9/2010 | Hartman | 320/101 |
| 2011/0121654 A1 | 5/2011 | Recker et al. | |
| 2012/0274440 A1 | 11/2012 | Meadows et al. | |
| 2013/0241479 A1* | 9/2013 | Wright et al. | 320/109 |

FOREIGN PATENT DOCUMENTS

| | | |
|---|---|---|
| JP | 10155247 | 6/1998 |
| JP | 2012005333 | 1/2012 |

(Continued)

OTHER PUBLICATIONS

International Search Report of International Application No. PCT/US2013/074336—Date of Completion of Search: Apr. 4, 2014—3 pages.

(Continued)

*Primary Examiner* — Edward Tso
(74) *Attorney, Agent, or Firm* — Locke Lord LLP

(57) ABSTRACT

An EVCS equipped with an accelerometer to detect seismic events. Upon sensing a catastrophic environmental event, the EVCS is automatically disconnected from the main utility power source. A controller powered by a backup or alternate power source inside the EVCS monitors the seismic activity, and upon sensing the seismic event is over, the EVCS automatically performs a startup check. If utility power is present and the self-check passes, the EVCS resets and provides power from the main utility to the charging connector. If the EVCS is operable but utility power is unavailable, the EVCS switches to a generator or a UPS. The EVCS can provide multiple power outlets, including USB outlets, and emergency lighting. The EVCS can also be retrofitted or constructed with a communications interface for communicating status and operational information following a seismic event.

18 Claims, 6 Drawing Sheets

(56) References Cited

FOREIGN PATENT DOCUMENTS

| JP | 2012023948 | 2/2012 |
|---|---|---|
| KR | 1020120128313 | 11/2012 |

OTHER PUBLICATIONS

PCT Written Opinion of the International Searching Authority for International Application No. PCT/US2013/074336—Date of Completion of Search: Apr. 4, 2014—7 pages.

English Language Machine Translation of Japanese Patent Publication No. JP10155247—12 pages.
English Language Machine Translation of Japanese Patent Publication No. JP2012005333—15 pages.
English Language Machine Translation of Japanese Patent Publication No. JP2012023948—34 pages.
English Language Machine Translation of Korean Patent Publication No. KR1020120128313—26 pages.
COLIBRYS, Datasheet for SF2006SN.A / Single Axis Class B Seismic Accelerometer, (6 pages) Dated Jan. 2012.

\* cited by examiner

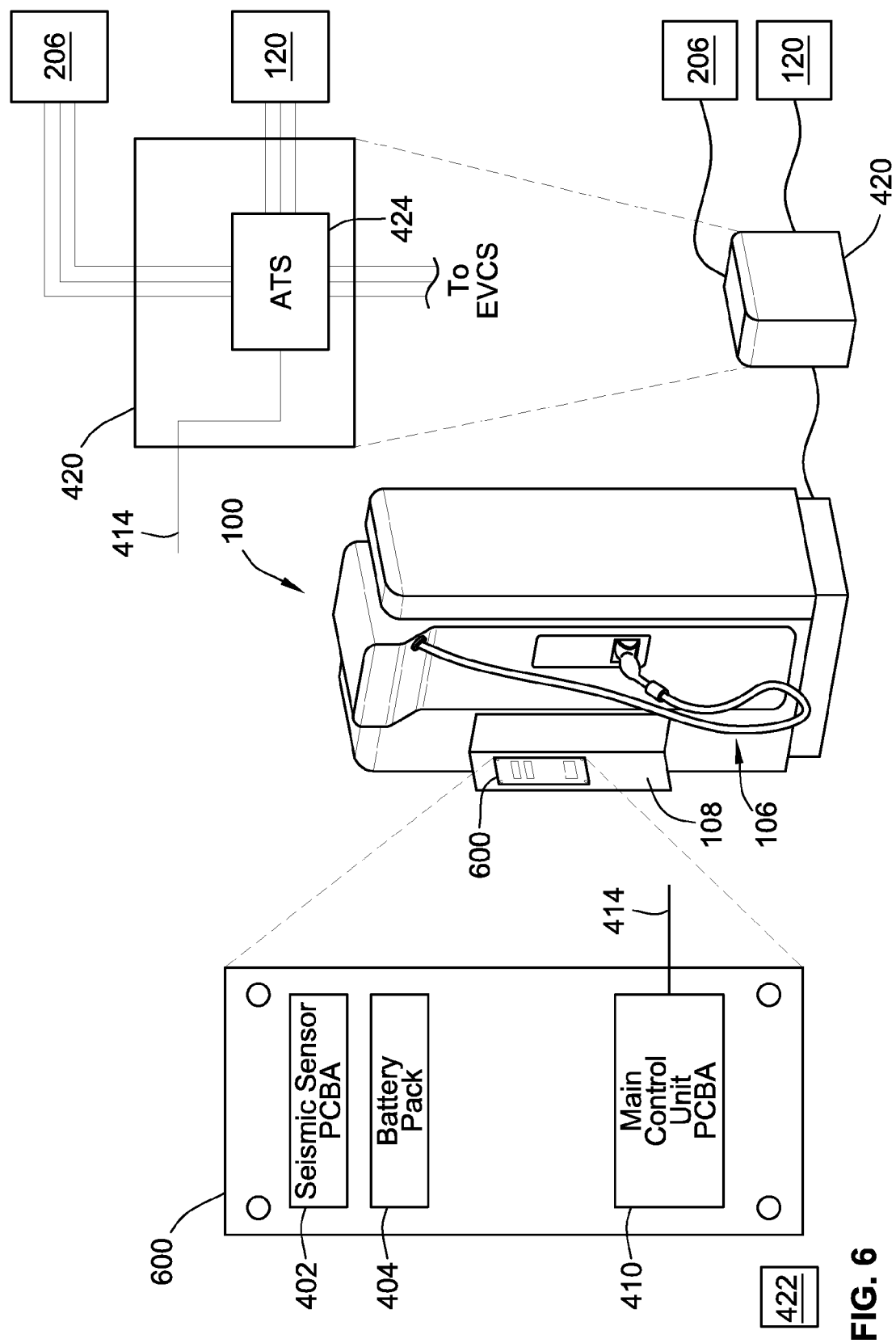

EVCS POWER SWITCHING FOLLOWING A CATASTROPHIC SEISMIC EVENT

FIELD OF THE INVENTION

The present disclosure relates to an electric vehicle charging station (EVCS), and more particularly, for example, to an EVCS retrofitted or equipped with an auto-resettable seismic sensor.

BACKGROUND

As demand for electric vehicles increases, so, too does the demand for electric vehicle charging stations (EVCS) that are need to recharge the batteries that power the power train of the electric vehicle. EVCS stations will be located in "seismic zones" throughout the world, but once they are installed, existing EVCS stations will lack any capability to react safely to seismic events, such as earthquakes. While some seismic events can be totally catastrophic, others may still permit some, if not all, operational functions to be carried out by the EVCS, but restoring these operational functions needs to be done in a careful and reliable manner. What is needed is an automatically resettable EVCS equipped with or retrofitted with a seismic sensor.

BRIEF SUMMARY

A retrofit kit or assembly that includes seismic detection hardware and functionality is described. The kit or assembly can be installed quickly into an existing EVCS onsite without having to remove any part of the EVCS from its installed location. Alternately, the seismic detection hardware and functionality can be incorporated into an EVCS during the manufacture or assembly of the EVCS.

The basic components of the kit or assembly include an accelerometer, a programmable logic controller, and a controller. If the existing EVCS lacks a switch, the kit or assembly further includes an automatic transfer switch (ATS) and optionally a remotely resettable circuit breaker for disconnecting the EVCS from a main utility power source. The kit also includes an alternate power source, such as a generator or an uninterruptible power supply (UPS), which is installed in or next to the EVCS onsite. The kit or assembly can be provided on a substrate and an enclosure, which can house the alternate power source, the circuit breaker, and the switch. The accelerometer, controller, and PLC can be provided on the substrate. The substrate is mounted inside the EVCS, such as on an interior panel or door of the EVCS, and a signal conductor is connected between the controller and the switch and the circuit breaker. If the existing EVCS lacks communications capability to communicate to an external system, the kit or assembly can include a communications interface and an antenna for sending wireless status and operational information following detection of a seismic event.

The accelerometer detects a seismic event by outputting a voltage indicative of a characteristic (e.g., magnitude) of the seismic event. The controller monitors this voltage output until a threshold is exceeded, optionally for a predetermined period of time. Once this threshold has been exceeded, the PLC instructs the circuit breaker to open, thereby disconnecting the electrical charging connector of the EVCS from the main power source. The controller continues to monitor the output voltage of the accelerometer until the controller determines that the seismic event has ended, such as when the output voltage is below the threshold for a period of time.

Following the seismic event, the key components of the EVCS, such as the accelerometer, the controller, the PLC, and optionally the communications components, are powered by a DC source, such as a battery, or by an alternate power source, such as the UPS. In the latter case, the ATS is instructed to switch power from the main power source to the UPS so that energy can flow to these key components while the controller performs a system check of the EVCS. If the system check fails, such that the controller determines that one or more components of the EVCS are in a failure mode or non-operational, the PLC maintains the circuit breaker in an open status such that no energy can flow to the electrical charging connector of the EVCS, and if the EVCS is equipped with an antenna and communications capability, the controller transmits a signal to an external system information about the operational status of the EVCS, for example, a service signal indicating that the EVCS requires service.

However, if the system check passes, the controller determines whether energy can be supplied from the main utility power source. If so, all energy is restored normally. Otherwise, the PLC instructs the switch to switch to an alternate power source, such as an emergency generator if available, or a UPS, and depending on the type of alternate power source available, different loads are energized. For example, if a generator is available, the ATS switches to connect the generator to the EVCS, and because the generator has a high power output, vehicle charging is allowed so energy is permitted to flow from the generator to the electrical charging connector of the EVCS. Electric vehicles can thus be charged even though no main utility power is available. On the other hand, if only a UPS is available as an alternate power source, vehicle charging is preferably disallowed. In both cases, other limited loads can be energized, such as emergency lights, a USB port, an electrical outlet, and communications if available. The USB port and electrical outlet allow users to charge their mobile devices, for example, following a seismic event. If the EVCS is equipped with a video display, the video display can also be put into a mode where it operates as an emergency light, such as by displaying a static white image on the video display or a flashing pattern. The brightness level of the video display can be increased to its maximum setting in this emergency mode.

The foregoing and additional aspects and embodiments of the present invention will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the invention will become apparent upon reading the following detailed description and upon reference to the drawings.

FIG. 6 is an example of a retrofit kit that includes an accelerometer and which is installed into an existing EVCS without communications capability.

Figure 1:
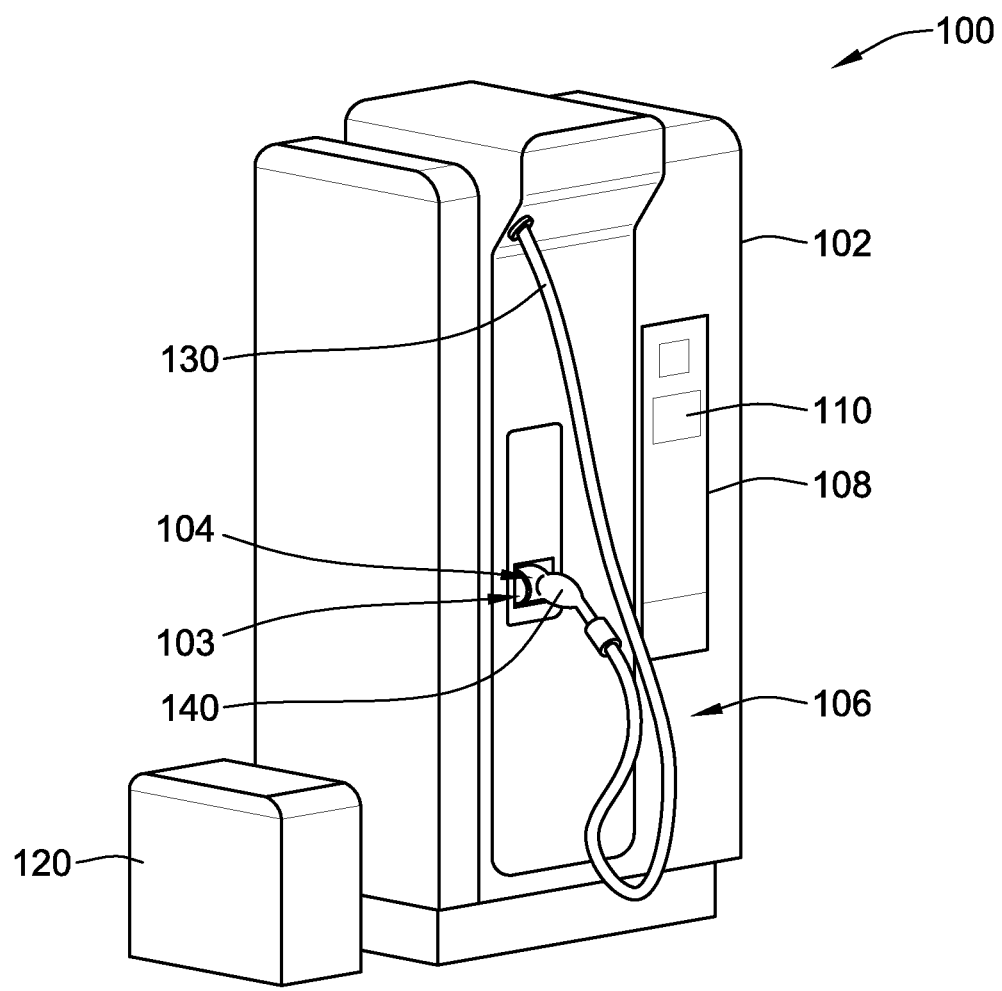
FIG. 1 is a perspective illustration of an example electric vehicle charging station (EVCS) according to an aspect of the present disclosure with an alternate power source separately housed adjacent to the EVCS.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

Turning now to the drawings, FIG. 1 illustrates an example electric vehicle charging station (EVCS) 100 that includes a pedestal 102 connected to a main electrical power source 206 such as an electric utility grid. Electric vehicles have drivelines or power trains that are primarily powered by electric motors that draw from a rechargeable energy storage device such as a battery in the electric vehicle, as well as optionally exchanging information. The electric vehicle typically has an electrical receptacle for receiving an electrical connector (also referred to as an electrical charging connector) coupled to an electrical power supply for charging the batteries in the electric vehicle. As used herein, the term "electric vehicle" includes both vehicles that use only electrical power and so-called hybrid vehicles in which the power train uses both an electrical power source and an internal combustion engine. It should be noted that the EVCS can take any form factor, not just the exemplary form factor shown in the drawings herein. These examples are shown for ease of illustration. An aspect of the present disclosure relates to a retrofit kit that can be readily added to a conventional or existing EVCS without having to redesign or reconfigure the EVCS. The retrofit kit can be a module, such as in the form of a printed circuit board or other substrate that can be optionally housed within an enclosure, as will be described in more detail below. Thus, it should be emphasized that aspects of the present disclosure are intended to be utilized with any conventional or existing EVCS. Alternately, these aspects can be incorporated into an EVCS as part of the assembly of the EVCS during the manufacturing process and before the EVCS is installed at a site.

The basic components of the EVCS are as follows, with reference to FIGS. 1 and 2. In general, reference numbers begin with the number of the figure, and like reference numbers refer to like elements throughout the various illustrations, even when they might appear in different implementations or embodiments. The use of the same reference number means that the element being referenced is like the element already discussed earlier. For example, the reference number for the alternate power source is 120, but this can refer to, for example, in different implementations, a uninterruptible power supply (UPS) or a generator. The generator can sometimes be referred to as an emergency backup power source, but it is a form of an alternate power source.

The EVCS 100 shown in FIG. 1 and referred to throughout the illustrations generally has a pedestal 102, which includes a docking station 103 that is configured to receive an electrical connector assembly 104. A "pedestal" as used herein is intended to be inclusive of the main body or housing of any EVCS unit, whether wall-mounted or earth-mounted. The electrical connector assembly 104 connects the main power source 206 (shown in FIG. 2) to the rechargeable battery (not shown) in the electric vehicle (not shown) whose driveline is powered at least partially by the rechargeable battery. "At least partially" as used in this context means that the driveline can also be powered by an internal combustion engine, such as hybrid vehicles.

The EVCS 100 also includes a panel 108, which can be in the form of a hinged door that is releasable and locked from inside the EVCS 100. This panel 108 can be removable and swapped out for another panel to allow an existing EVCS 100 to be retrofitted with a module or assembly according to the present disclosure. The panel 108 also includes a video display 110, such as a liquid crystal display, that can be used to provide emergency lighting as described in more detail below.

The EVCS 100 includes an accelerometer 202 (see FIG. 2) that is configured to sense seismic activity (or a seismic event) and output an output signal indicative of the seismic activity. A suitable, albeit merely exemplary, accelerometer is the SIFLEX® accelerometer available from Acal Technology. The output signal is typically in the form of a scaled voltage that is ranged to provide an indication of the severity of the detected seismic activity. Seismic activity includes any waves of energy that travel through the Earth as a result of an earthquake, explosion (whether natural or human-caused), volcano, tornado, hurricane, tropical storm, tsunami, or any other natural or human-caused activity (e.g., pile-driving, nuclear explosion) that causes non-quiescent waves of energy to travel through the Earth. Seismic activity can be benign or catastrophic depending on the magnitude and/or duration of the seismic activity.

The EVCS 100 further includes a switch 204, such as an automatic transfer switch, which is configured to switch between the main power source 206 (e.g., an electric utility grid) and an alternate power source 120 that is isolated from the main power source 206. The state of the switch 204 can be controlled by a controller 220, which is also electrically coupled to the accelerometer 202 to receive its output signal. The EVCS 100 further includes a circuit breaker 210 that is connected between the main power source 206 or the alternate power source 120 (depending on the state of the switch 204) and the electrical connector assembly 104. The circuit breaker 210 protects the rechargeable battery in the electric vehicle by tripping if an electrical fault, such as a short circuit, a ground fault, or an arc fault, for example, is detected by the circuit breaker 210. The alternate power source 120, as shown in FIG. 1, can be housed in a separate weatherproof enclosure from the EVCS 100 and positioned near the EVCS 100 and connected thereto. An example of a suitable alternate power source 120 is the APC 2200 VA Smart-UPS XL 120V available from Schneider Electric USA, Inc., such as model number SUA2200XL. The accelerometer 202 and the controller 220 are shown in FIG. 2 as being outside the EVCS 100 because they can be supplied on a retrofit kit that is installed into an existing EVCS 100. Thus, once installed, the accelerometer 202 and the controller 220 become housed within the EVCS 100. The alternate power source 120 can be a separate unit from the EVCS 100, or it can be alternately incorporated into the EVCS 100. However, when an existing EVCS 100 without an accelerometer is being upgraded to include the retrofit assembly of the present disclosure, the alternate power source 120 can readily be connected to an existing EVCS 100 and installed next to it. Or, as mentioned above, the alternate power source 120 can be incorporated into the EVCS 100 instead of being provided as a separate unit from the EVCS 100.

The controller 220 operates under the control of programmed firmware or software instructions, which are machine-readable and can be stored on one or more non-transitory medium or media. The controller 220 determines, based on the output signal from the accelerometer 202, whether a seismic criterion is satisfied. The controller 220 can take other signals or inputs (e.g., from a pressure sensor, or a water sensor) into consideration, but in this example, it uses at least the output signal from the accelerometer 202. In response to the controller 220 determining that the seismic criterion is satisfied, the controller 220 causes the circuit breaker 210 to disconnect the electrical connector assembly 104 from the main power source 206. Thus, the controller 220 can be electrically coupled to the circuit breaker 210, which can receive a trip instruction from the controller 220 and trip when the trip instruction instructs the circuit breaker 210 to trip.

Within the pedestal 102, the main power source 206 is connected to one end of a power cable 130 via conventional safety devices such as a circuit breaker 210 or a fuse. The other end of the power cable 130 is connected to a first end of an electrical connector assembly 104 (see FIG. 1) within a handle 140 of the assembly 104, to facilitate coupling the connector assembly 104 to a power source such as the main power source 206 or an alternate power source 120. The second end of the connector 130 at the end of the handle 140 includes multiple first electrical terminals that are adapted to engage mating second electrical terminals in the electric vehicle inlet, i.e., the electrical receptacle that is standard equipment in electric vehicles. The current standard for electrical connectors for charging electric vehicles in the United States for level 1 and 2 is the SAE J1772 standard and for level 3 is the G105-1993 CHAdeMO protocol, for both the male and female electrical terminals used to connect the battery in an electric vehicle to an EVCS to re-charge the vehicle battery. The J1772 connectors include three detachable conductors for connecting and disconnecting the positive, negative and neutral lines of the electrical power source to the positive and negative terminals of the vehicle battery, and a vehicle ground terminal. The battery then receives and stores electrical power for future use by the vehicle. The G105-1993 CHAdeMO protocol includes ten detachable conductors.

When the charging station 100 is not in use, the connector assembly 104 is inserted into the docking station 103 on the pedestal 102. In an aspect, the docking station 103 typically does not include any electrical connectors, but provides physical support and protection for the connector assembly 104 when it is not in use. In another aspect, the docking station 103 can include a self-diagnostics module that checks the integrity of the connector assembly 104.

Figure 2:
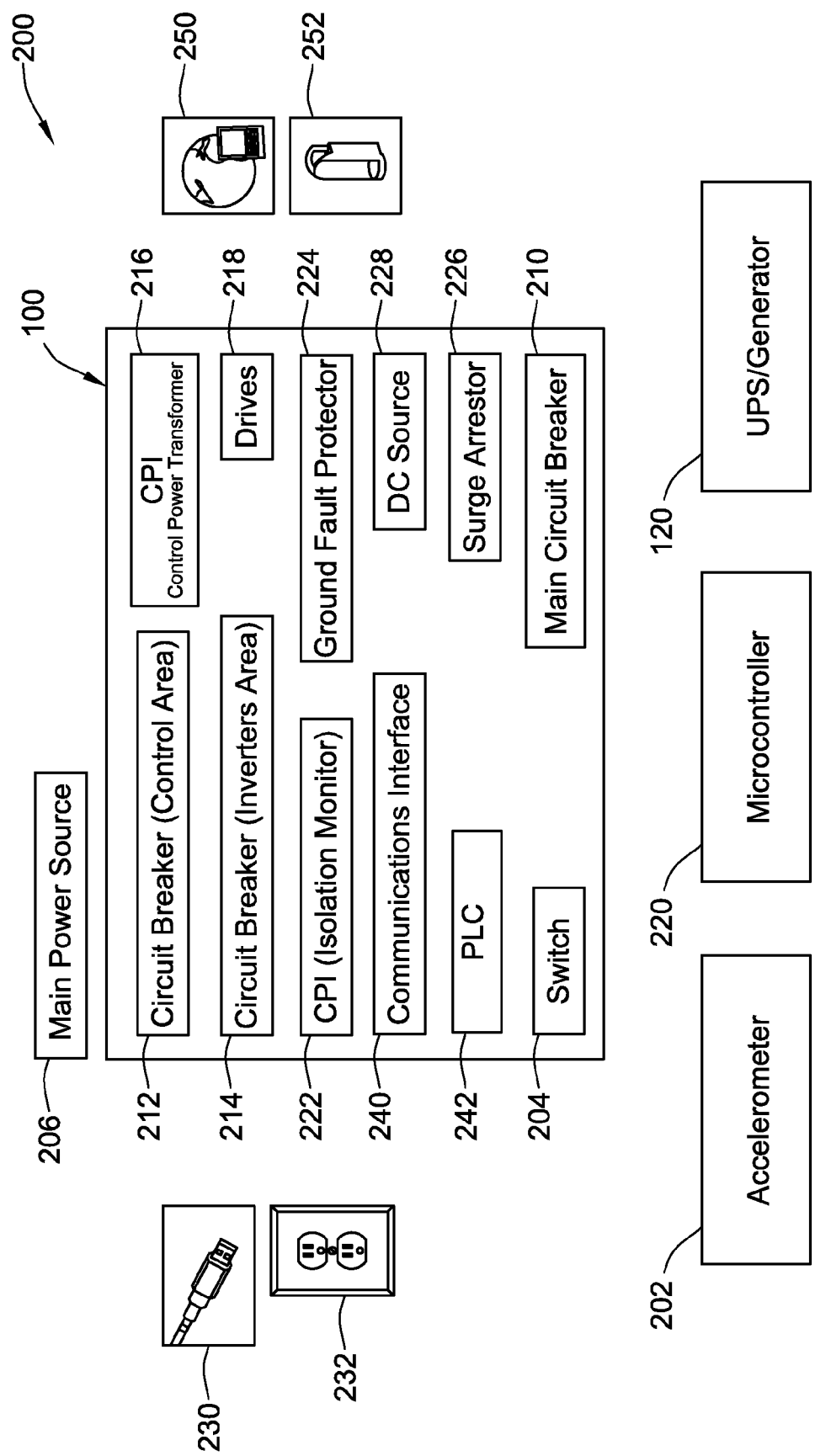
FIG. 2 is a functional block diagram of the EVCS and some of the components that are pre-installed or retrofitted into an existing EVCS, including an accelerometer according to an aspect of the present disclosure.

Referring to FIG. 2, the EVCS 100 includes a number of other components, such as a circuit breaker 212 that protects loads in a control area of the EVCS 100. The control area includes the electronic components that control operations of the EVCS, such as a programmable logic controller (PLC) 242 (which, as mentioned above, can be incorporated into the accelerometer 202) connected to the main circuit breaker 210, a communications interface 240, and the controller 220, for example. Another circuit breaker 214 protects conventional power inverters (not shown) in the EVCS 100. The EVCS 100 includes an isolation or insulation monitoring device 222 for detecting insulation faults in an ungrounded system between an energized conductor and earth, a ground fault protector 224, which can optionally be incorporated into the main circuit breaker 210. A surge arrestor 226 protects the EVCS 100 from voltage surges, such as might emanate from the main power source 206. The EVCS 100 includes one or more drives 218 and a DC source 226, such as a battery. The one or more drives 218 can operate to act as an AC-to-DC inverter and to control the output current to the electric vehicle. An example of the PLC 242 can be the PLC M340 available from Modicon. The PLC 242 can be incorporated on the same substrate as the accelerometer 202 or in the same integrated circuit as the accelerometer 202. An example of the main circuit breaker 210 is the JDL36200BESALV.

During normal startup of the EVCS 100, the following components can be evaluated first (in no particular order) by the controller 220: a control power transformer 216, the drives 218, the communications interface 240, the DC source 226, and the main circuit breaker 210.

Other optional components external to the EVCS 100 can interface with the EVCS. For example, the EVCS 100 can be coupled to emergency lights 252, or to an electrical outlet 232. A universal serial bus (USB) interface 230 can also be provided to supply power to USB devices connected to the EVCS 100. The EVCS 100 includes a USB interface, such as incorporated in the communications interface 240. The communications interface 240 can be, for example, a CANlink command and control bus. A software application 250 can access status information from the EVCS or control any of the components of the EVCS 100 remotely, such as via the Internet over a wireless link, such as to a cellular network. This software application 250 can reside, for example, on a user's mobile phone or portable computing device.

Figure 3:
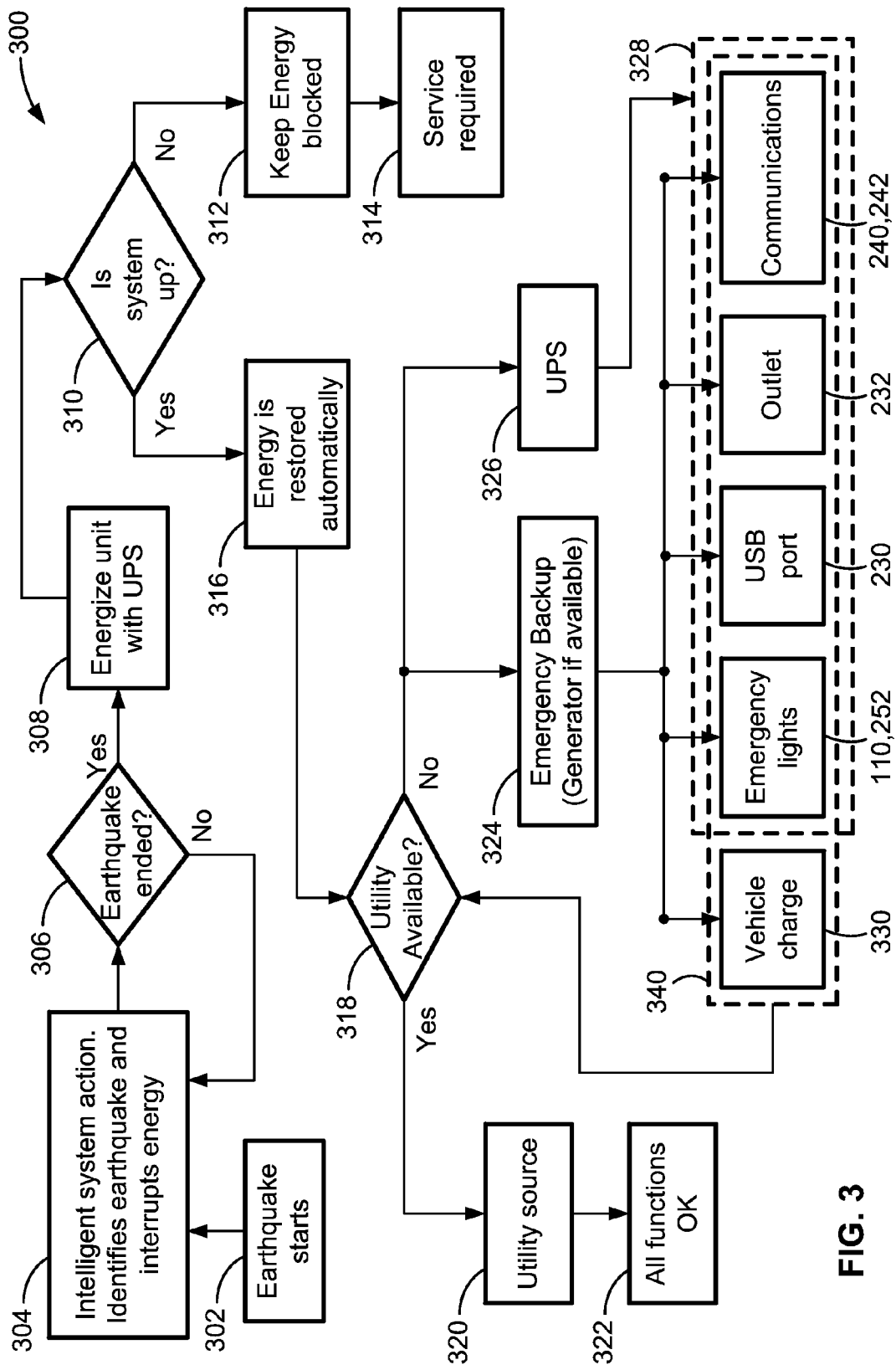
FIG. 3 is an example flow chart if a method or algorithm carried out by a controller that detects seismic activity and determines whether power from one of multiple power sources can be restored to the EVCS following a seismic event.

FIG. 3 illustrates a flow chart 300 of an example implementation of the present disclosure. An earthquake or other seismic event occurs (302), which is detected by the accelerometer 202, which outputs an output signal indicative of the severity or magnitude of the seismic event. If the output signal exceeds a threshold value indicative of a catastrophic seismic event (304), the controller 220 sends a signal to the PLC 242, which instructs the main circuit breaker 210 to trip, thereby disconnecting the EVCS 100 from the main power source 206. At a minimum, the electrical connector assembly 104 is electrically disconnected from the main power source 206 such that no power can flow to the connector. In addition to severity, the seismic criterion can also include whether the output signal from the accelerometer 202 exceeds the threshold value for a predetermined period of time. For example, a low-magnitude seismic event lasting a fraction of a second may not be sufficient to satisfy the seismic criterion. Alternately, a high-magnitude seismic event lasting a fraction of a second may be sufficient to satisfy the seismic criterion. In other words, the seismic criterion can be satisfied based upon a determination of magnitude (as indicated by the accelerometer 220) and duration, and these values can be different for different combinations of severity and duration. A catastrophic seismic event can include a seismic event of such a magnitude that would cause internal damage to the EVCS 100 or compromise the integrity of energized conductors within the EVCS 100 so as to create a permanent and potentially unsafe condition that can result in electrical arcing or shorting of the conductors. By permanent, it is meant that the unsafe condition cannot be ameliorated automatically without human intervention.

The controller 220 continues to monitor the output signal from the accelerometer 202 to determine whether the seismic event has ended or at least has diminished in severity or magnitude such that the output signal no longer exceeds the threshold for a predetermined period of time (306). To supply temporary power to the EVCS 100 during a system check of the primary electrical components of the EVCS 100, the EVCS 100 can be powered by the alternate power source 120 (308) or by the DC source 228 inside the EVCS 100 (such as a battery). A purpose of the alternate power source 120 or DC source 228 during this system check phase is to power the minimum set of components necessary to complete the system check. These components include the accelerometer 202 so that it can continue monitoring for seismic activity, the microcontroller 220, the main circuit breaker 210, the PLC 242 to control the operation of the main circuit breaker 210, the communications interface 240 to receive external instructions or transmit status information to an external system, and the switch 204 to control whether the EVCS 100 is powered by the main power source 206 or the alternate power source 102.

A system check verifies the integrity of each one of the different functions and components of the EVCS 100. For example the controller 220 can request status information from some or all of the components inside the EVCS 100, and each of those components can transmit back to the controller 220 a signal indicating that all of the functions of that component are operating normally. If the controller 220 does not receive a timely acknowledgement from a component, the controller 220 considers that component to be in a failure mode or non-operational. As stated above, the controller 220 can be powered by the UPS 120 and/or by the DC source 228, such as a battery, during the system check.

Upon successful completion of the system check, the controller 220 determines whether the EVCS 100 can be connected to the main power source 206 (310) and restores energy to the EVCS 100 either from the main power source 206 or from the alternate power source 102 (316). For example, following an earthquake, the main power source 206 can become unavailable, so the controller 220 checks whether power can be safely restored to the EVCS 100 from the main power source 206 (318). If the main power source 318 is available, the controller 220 instructs the switch 204 to switch power to the main power source 318 (320), thereby restoring power from the main power source 318 to the EVCS 100, which resumes its normal operation (322).

However, if the main power source 318 is not available, such as due to a power outage from the main utility supplying the energy from the main power source 318, the controller 220 can instruct the switch 204 to switch to an alternate power source 120, such as an emergency backup power source (324), such as a gas- or diesel-powered generator, or a UPS (326). Depending upon which alternate power source is selected, a different set of loads 328, 340 can be powered. For example, if only a UPS is available as the alternate power source 120, the UPS would not have sufficient energy to support an extended vehicle charge, so the loads 328 that can be powered when the alternate power source 120 is a UPS are one or more of the emergency lights 110, 252, the USB port 230 (e.g., to support charging of portable electronic devices), the electrical outlet 232, and the communications interface 240. To prevent the electrical connector assembly 104 from receiving power from the UPS 120 during this emergency mode of operation, the PLC 242 can ensure that the circuit breaker 210 is open, thereby preventing energy flow to the electrical connector assembly 104, but the circuit breaker 212 can be closed to supply power to the loads 328. However, if a generator is available as the alternate power source 120, the generator has more energy-producing capacity compared to a UPS, and can therefore supply power to all of the loads 328 that are powered by the UPS in addition to supplying power to charge an electric vehicle (330). If the circuit breaker 210 is open, the PLC 242 can also instruct the circuit breaker 210 to close to connect the electrical connector assembly 104 to the generator 120. While the load sets 328 or 340 are being powered by the alternate power source 120, the controller 220 continuously or periodically monitors the main power source 206 to see whether it becomes available (318). Alternately, if both a generator and UPS are available as alternate power sources 120, both units can supply power to the loads 328, 340.

When the alternate power source 120 supplies power to the USB port 230 and/or the electrical outlet 232, the USB port 230 or electrical outlet 232 can be used following an earthquake, for example, to allow charging of portable communication devices, such as cellular phones. The video display 110 can act as emergency lighting in an emergency mode of operation, such as by displaying a static white image or a flashing pattern on the video display 110, and the light emanating from the video display 110 can provide illumination for the area in front of the EVCS 100. The video display 110 can, in conjunction with or instead of, the emergency lights 252, automatically turn on to display static image or flashing pattern following detection of a seismic event (302).

Following detection of a seismic event (304), the controller 220 can be further programmed to communicate using the communications interface 240 status information relating to the catastrophic seismic event or to the operational status of the EVCS 100 or both. The status information can include, for example, the state of the switch 204, the state of any of the circuit breakers 210, 212, 214, or whether the main power source 206 is available or whether the EVCS 100 is being powered by the alternate power source 120. The operational status of the EVCS 100 can include whether the electrical connector assembly 104 is connected to the main power source 206 or to the alternate power source 120, or which of the components during the system check passed the system check or were deemed to be in a failure mode.

Returning to the system check (310), if the system check fails such that the controller 220 determines that power cannot be restored to the EVCS 100 following the seismic event, circuit breaker 210 remains in an open state to disconnect the electrical connector assembly 104 from the main power source 206 and from the alternate power source 120 (312). The controller 220 can communicate, using the communications interface 240, a service signal to an external system, such as a remote monitoring facility, that the EVCS 100 requires service and that the EVCS 100 is in a non-operational state (314).

Figure 4:
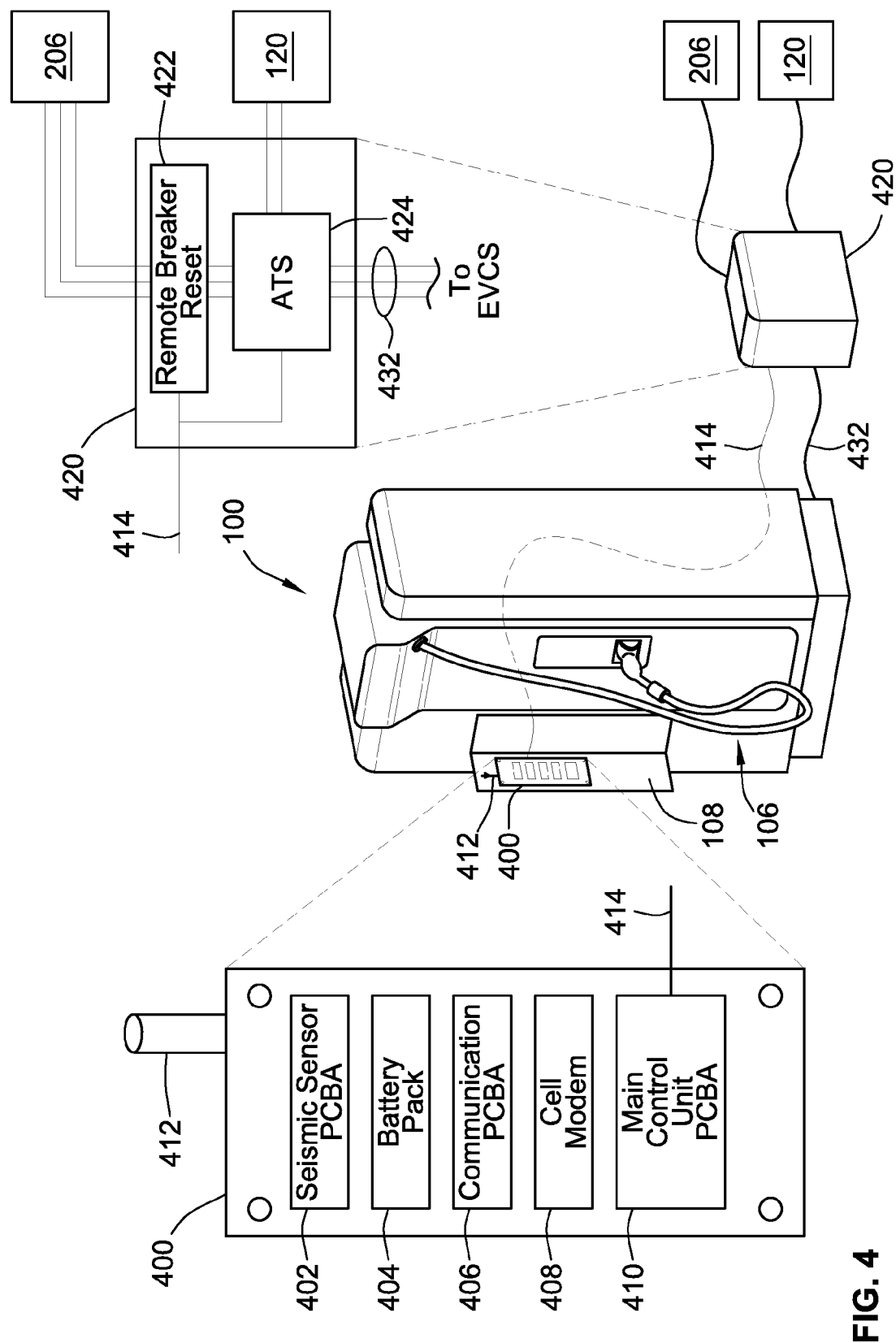
FIG. 4 is a an example of a retrofit kit that includes an accelerometer and which is installed into an existing basic EVCS that lacks a remotely resettable circuit breaker, an automatic transfer switch (ATS) to switch among multiple power sources, and a communications interface.
Figure 5:
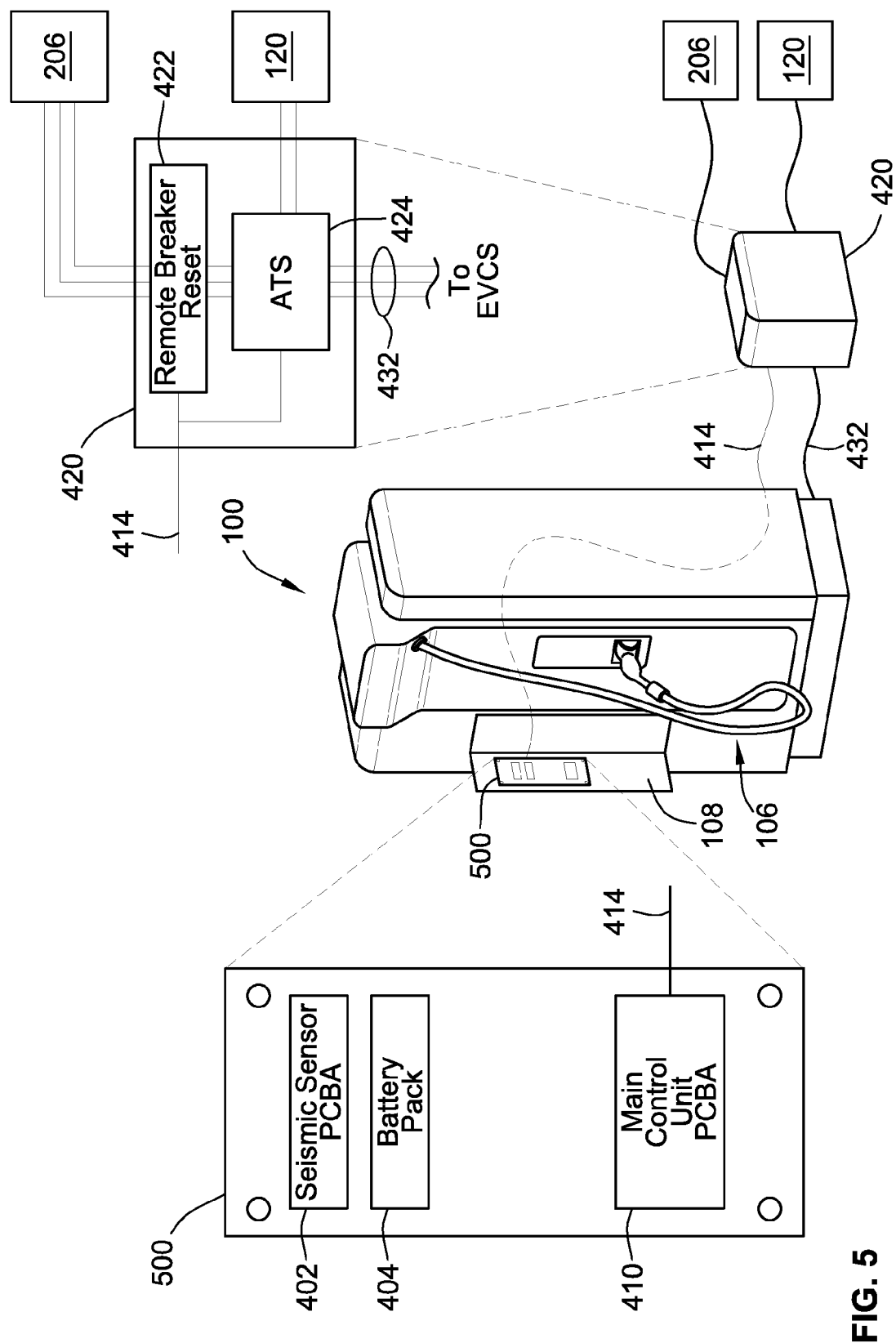
FIG. 5 is an example of a retrofit kit that includes an accelerometer and which is installed into an existing EVCS that has communications capability but still lacks a remotely resettable circuit breaker and an ATS to switch among multiple power sources.

FIG. 4 is an example of a retrofit kit or assembly for a basic EVCS that lacks communications capability with an external system. The retrofit kit or assembly includes a substrate or panel 400 and an antenna 412, such as an antenna configured for cellular communications. On the panel 400, a variety of printed circuit board assemblies (PCBA) can be arranged. The blocks shown in the panel 400 are shown as functional blocks and are not intended to convey their physical size or location on the panel 400. For example, the panel 400 includes a seismic sensor PCBA 402, which includes the accelerometer 202 shown in FIG. 2, a battery pack 404, which corresponds to the DC source 228 shown in FIG. 2, a communication PCBA 406, which includes the communications interface 240 shown in FIG. 2, a cellular modem 408, and a main control unit PCBA 410, which includes the controller 220 shown in FIG. 2. Note that although multiple PCBAs are shown in FIG. 4, in other implementations, fewer or a single PCBA can be used. The PCBA arrangement shown in FIG. 2 allows the retrofit kit to be modular, with different functionality offered for different retrofit kits, as will be explained in connection with FIGS. 5 and 6. FIGS. 4-6 illustrate different examples of retrofit assemblies in descending order of functionality, with FIG. 4 representing a comprehensive set of functionality and FIG. 6 representing a minimum set of functionality for the retrofit kit or assembly.

In FIG. 4, the EVCS 100 lacks the switch 204 and the breaker 210 (e.g., because it is pre-configured to receive power from a single power source, namely the main power source 206). Such an EVCS will be termed a "basic EV charger" because it offers basic charging functionality. The switch 204 and the breaker 210 are therefore provided remotely from the EVCS 100. The same reference number will be used to refer to the EVCS in FIGS. 4-6, even though the EVCS devices illustrated in these figures have different sets of functionality, they share common components as described above and will not be repeated here. A control signal 414 from the main control unit PCBA 410 is connected to a remote (relative to the EVCS 100) circuit breaker 422 and to an automatic transfer switch (ATS) 424, both of which are housed in an enclosure or housing 420. The ATS 424 is coupled to the main power source 206 through the remote circuit breaker 422 and to the alternate power source 102. The output of the ATS 424 is connected to the EVCS 100 shown in FIG. 4 by conductors 432.

To retrofit an existing EVCS 100 with the panel 400, the panel 400 is installed onto the panel or door 108 of the existing EVCS 100 onsite and without having to remove the EVCS 100 from its installed location. Of course, if the existing EVCS 100 already has a circuit breaker 210 and a switch 204, the housing 420 is not needed in such an implementation. However, in the illustrated example, the EVCS 100 shown in FIG. 4 lacks a remotely controlled circuit breaker and an ATS, so these are provided in the housing 420 and connected to the existing EVCS 100. A signal conductor 414 that carries a control signal from the main control unit PCBA 410 to the remotely resettable circuit breaker 422 is also connected between the panel 400 and the housing 420 through the EVCS 100.

In FIG. 5, the existing EVCS 100 already has a communications interface 240, so the panel 500 shown in the FIG. 5 example lacks a communication PCBA, such as the communication PCBA 406 shown in FIG. 4. Like reference numbers refer to like elements in FIG. 5. In this example, the panel 500 includes the seismic sensor PCBA 402, the battery pack 404, and the main control unit PCBA 410, but lacks the communication PCBA 406, the cellular modem 408, and the antenna 412 present in the panel 400 of FIG. 4. Like the panel 400 of FIG. 4, the panel 500 of FIG. 5 is installed into the panel or door 108 of the existing EVCS 100, and the signal conductor 414 is connected between the main control unit PCBA 410 of the panel 500 through the existing EVCS 100 and to the remotely resettable circuit breaker 422 in the housing 420.

In FIG. 6, the existing EVCS 100 can be a fast charger type that lacks communications capability and a way of switching among multiple power sources. To retrofit such an existing EVCS, a panel 600 is installed into the door or panel 108 of the existing EVCS 100 shown in FIG. 6. Like the panel 500 shown in FIG. 5, the panel 600 shown in FIG. 6 includes the seismic sensor PCBA 402, the battery pack 404, and the main control unit PCBA 401, but lacks the communication PCBA 406, the cellular modem 408, and the antenna 412 present in the panel 400 of FIG. 4. A control signal conductor 414 is connected between the main control unit PCBA 410 of the panel 600 through the existing EVCS 100 and to the ATS 424 in the housing 420. A remotely resettable circuit breaker 422 can be installed into the existing EVCS 100 and connected to the main control unit PCBA 410.

Any of the loads 328 shown in FIG. 3 can also part of a retrofit kit or assembly and added to any existing EVCS, such as any of those shown and described in connection with FIG. 1, 2, 4, 5, or 6.

While particular embodiments and applications of the present invention have been illustrated and described, it is to be understood that the invention is not limited to the precise construction and compositions disclosed herein and that various modifications, changes, and variations can be apparent from the foregoing descriptions without departing from the spirit and scope of the invention as defined in the appended claims.

What is claimed is:

1. An electric vehicle charging station (EVCS), comprising:
   a pedestal including a docking station;
   an electrical connector assembly adapted to be received in the docking station and to connect a main power source to a rechargeable battery in a vehicle whose driveline is powered at least partially by the battery;
   an accelerometer configured to sense seismic activity and output an output signal indicative of the seismic activity;
   a switch configured to switch between the main power source and an alternate power source that is isolated from the main power source;
   a circuit breaker connected between the main power source and the electrical connector assembly; and
   a controller coupled to the accelerometer and to the switch, the controller receiving the output signal and being programmed to:
      determine, based on at least the output signal, whether a seismic criterion is satisfied;
      in response to determining that the seismic criterion is satisfied, cause the circuit breaker to disconnect the electrical connector assembly from the main power source;
      responsive to causing the electrical connector assembly to be disconnected from the main power source, perform a system check of the EVCS to determine whether power can be restored to the EVCS following a catastrophic seismic event;
      responsive to determining that power can be restored to the EVCS following the catastrophic seismic event, determine whether to connect the EVCS to the main power source or to the alternate power source;
      responsive to a determination to connect the EVCS to the main power source, instruct the switch to connect the EVCS to the main power source; and
      responsive to a determination to connect the EVCS to the alternate power source, instruct the switch to connect the EVCS to the alternate power source.

2. The EVCS of claim 1, wherein the seismic criterion includes whether the output signal exceeds a threshold value that is indicative of a catastrophic seismic event.

3. The EVCS of claim 2, wherein the seismic criterion further includes whether the output signal exceeds the threshold value for a predetermined period of time.

4. The EVCS of claim 1, wherein the controller is powered by the alternate power source as the controller performs the system check.

5. The EVCS of claim 1, wherein the controller is further programmed to:
- responsive to a determination to connect the EVCS to the alternate power source, determine whether the alternate power source is an uninterruptible power supply or a generator;
- if the alternate power source is a generator, instruct the switch to connect the generator to the electrical connector assembly to permit charging of the rechargeable battery of the vehicle coupled thereto and close the circuit breaker to connect the electrical connector assembly to the generator; and
- if the alternate power source is an uninterruptible power supply, instruct the switch to connect the uninterruptible power supply to electrical components of the EVCS except the electrical connector assembly such that the electrical connector assembly cannot charge the rechargeable battery of the vehicle.

6. The EVCS of claim 5, further comprising a universal serial bus port and a communications interface, and wherein the controller is further programmed to communicate using the communications interface status information relating to the catastrophic seismic event or to the operational status of the EVCS or both.

7. The EVCS of claim 4, wherein the electrical components include further comprising a universal serial bus port, an electrical outlet configured to receive an AC power plug, and a communications interface.

8. The EVCS of claim 4, wherein the electrical components include further comprising a video display viewable from the pedestal, the controller being programmed to display, responsive to determining that power can be restored to the EVCS, an image or pattern on the video display so that the video display operates as an emergency light to illuminate an area in front of the video display.

9. The EVCS of claim 4, wherein the electrical components include further comprising a universal serial bus port, a communications interface, an electrical outlet configured to receive an AC power plug, wherein the controller is further programmed to cause the generator to be electrically coupled to the electrical components and to the electrical connector assembly and to instruct the circuit breaker to close so that the generator connects to the electrical connector assembly.

10. The EVCS of claim 9, wherein the controller is further programmed to display, responsive to determining that power can be restored to the EVCS, an image or pattern on the video display so that the video display operates as an emergency light to illuminate an area in front of the video display.

11. The EVCS of claim 4, wherein, responsive to determining that power cannot be restored to the EVCS following the catastrophic seismic event, the circuit breaker remains in an open state to disconnect the electrical connector assembly from the main power source and from the alternate power source.

12. The EVCS of claim 11, wherein the electrical components include a communications interface, and wherein the controller is further programmed to, under power from the alternate power source, communicate a service signal via the communications interface to an external system, the service signal being indicative of a non-operational status of the EVCS.

13. The EVCS of claim 1, wherein the alternate power source includes an uninterruptible power supply or a generator.

14. The EVCS of claim 1, wherein the main power source is obtained from a utility power source, and the alternate power source derives no energy from the utility power source.

15. A retrofit assembly configured for installation into an existing electric vehicle charging station (EVCS), comprising:
- a switch configured to switch between a main power source and an alternate power source that is isolated from the main power source; and
- a substrate that includes:
  - an accelerometer configured to sense seismic activity and output an output signal indicative of the seismic activity;
  - a controller coupled to the accelerometer and to the switch, the controller receiving the output signal and being programmed to determine, based on at least the output signal, whether a seismic criterion is satisfied, and responsive to the seismic criterion being satisfied, cause the switch to switch from the main power source to the alternate power source;
  - a battery pack to power at least the accelerometer and the controller in response to the controller determining that the seismic criterion is satisfied; and
  - a communications interface,
- wherein the assembly further includes an antenna coupled to the communications interface, and
- wherein the controller is configured to communicate using the communications interface status information relating to a catastrophic seismic event or to the operational status of the EVCS or both.

16. The retrofit assembly of claim 15, further comprising a housing that includes the switch and a remotely resettable circuit breaker connected between the main power source and the electrical connector assembly of the EVCS, and further comprising a signal conductor connected between the circuit breaker and the controller.

17. The retrofit assembly of claim 15, wherein the alternate power source is a generator or an uninterruptible power supply (UPS), and wherein the seismic criterion includes whether the output signal exceeds a threshold value that is indicative of a catastrophic seismic event.

18. The retrofit assembly of claim 15, further comprising a universal serial bus port or an electrical outlet configured to receive an AC power plug, powered by the alternate power source in response the seismic criterion being satisfied.

* * * * *